E. T. DANIELS.
AUXILIARY AIR ATTACHMENT FOR AUTOMOBILES.
APPLICATION FILED JULY 30, 1919.
1,361,519. Patented Dec. 7, 1920.
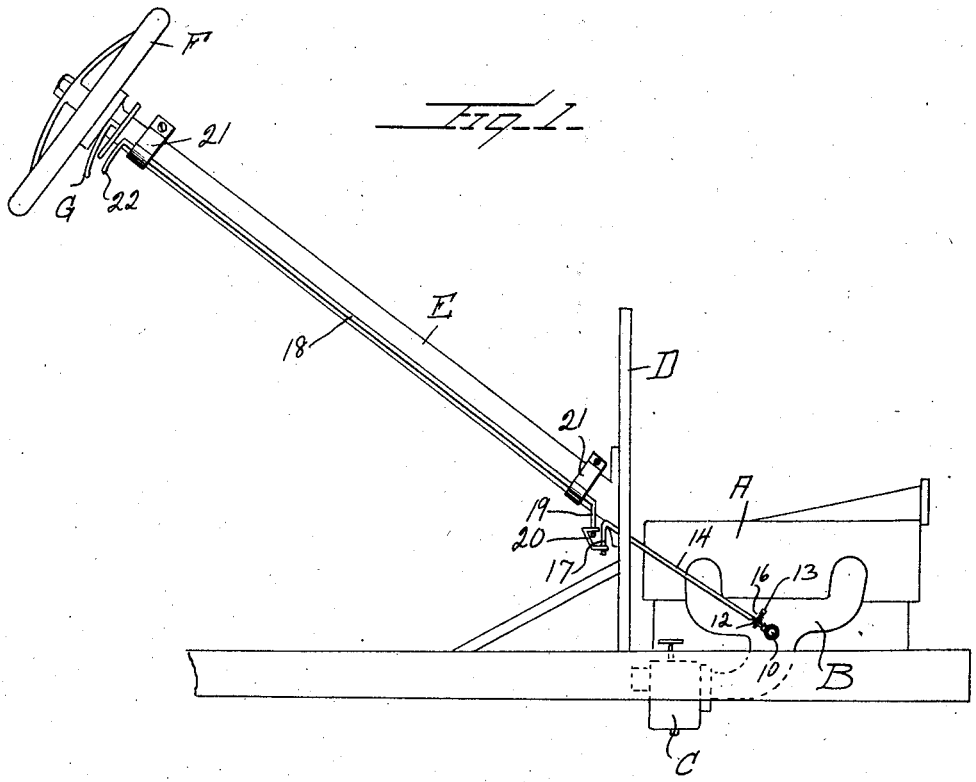
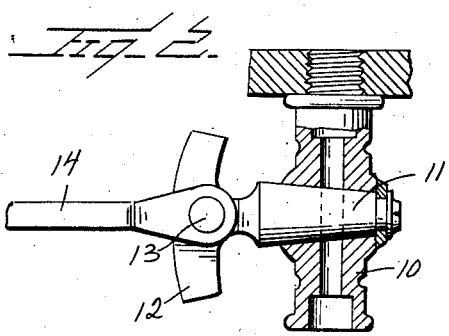
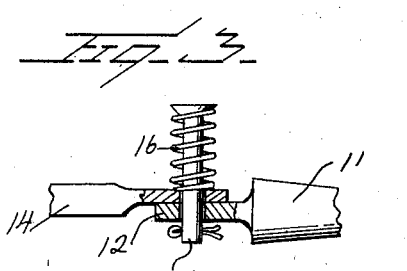
Inventor
E. T. Daniels
By Watson E. Coleman
Attorney

UNITED STATES PATENT OFFICE.

EDWARD T. DANIELS, OF TOWNSEND, DELAWARE, ASSIGNOR OF ONE-HALF TO LEWIS M. SHERWOOD, OF DUBOIS, PENNSYLVANIA.

AUXILIARY AIR ATTACHMENT FOR AUTOMOBILES.

1,361,519.  Specification of Letters Patent.  Patented Dec. 7, 1920.

Application filed July 30, 1919. Serial No. 314,223.

*To all whom it may concern:*

Be it known that I, EDWARD T. DANIELS, a citizen of the United States, residing at Townsend, in the county of New Castle and State of Delaware, have invented certain new and useful Improvements in Auxiliary Air Attachments for Automobiles, of which the following is a specification, reference being had to the accompanying drawings.

This invention relates to automobile attachments, and particularly to means for manually controlling the inlet of auxiliary air to the intake pipe of a Ford automobile.

It is a well known fact that all carbureters, and particularly those supplied on Ford cars, supply the cylinders with a mixture of gas and air which is too rich when the throttle is open, that is if the carbureter has been adjusted to idle properly.

The general object of my invention is to provide a convenient device whereby additional air may be secured.

And a further object is to provide an actuating means for the air valve, which is so disposed relative to the lever or handle mounted beneath the steering wheel for the purpose of regulating the throttle valve, that when this lever or handle is shifted in a direction to increase the speed, the air valve may also be conveniently opened by the same movement of the operator's hand, and when the throttle regulating lever or handle is shifted to decrease the speed, the actuating lever for the auxiliary air valve is also shifted to a position to close or decrease the opening of the air valve.

A further object is to provide a very simple mechanism for this purpose which is easily put in place, takes up little room, and which may be, if desired, regulated independently of the regulation of the throttle controlling lever.

My invention is illustrated in the accompanying drawings, wherein:—

Figure 1 is a side elevation of a portion of an automobile with my device applied thereto;

Fig. 2 is a sectional view of the auxiliary air inlet valve;

Fig. 3 is a sectional view through the valve stem and the connecting rod 14.

Referring to these drawings, it will be seen that I have illustrated a portion of the power plant of a Ford automobile, including the engine block A, the intake pipe B leading from the carbureter C, the dash D, the steering column E, the steering wheel F, and the throttle regulating lever G moving over the usual quadrant.

My invention contemplates disposing in the intake pipe an auxiliary air pipe 10, having therein a conventional form of rotatable air controlling valve 11, the apex of rotation of the valve being fixed. The stem of this valve is formed with a transversely extending bar 12, which is provided with an opening adapted to register with a similar opening provided in a rotatable rod 14. A pin 13 is disposed in said registering openings, said pin being smaller in diameter than the openings so as to facilitate the operation of the valve 11 and permit unobstructed movement of the rod 14. A spring 16 is disposed between the head of the pin and the rod and the lower end of the pin may be supplied with a cotter pin or other like device. It is not necessary to rotate the valve to any great extent, but only enough to move the passage in the valve out of registration with the passage in the valve casing.

It will be seen that I have provided a universal joint between the stem of the cock or valve and the rod 14 so that this rod may be shifted into angular relation within certain limits to the valve stem, which will permit the rotation of the rod to rotate the valve. This rod 14 extends through the dash board D, the apex of rotation of the rod 14 at the point where it passes through the dashboard being fixed. The end portion of the rod is angularly bent, as at 17. Rotatably mounted upon and parallel to the steering column E and in spaced parallel relation to the rod 14 is a shaft 18 which, at its lower end, is angularly bent, as at 19, and connected by means of a laterally extending connecting rod 20 to the angularly bent end 17 of the shaft or rod 14. The connecting rod 20 can be made in various lengths so as to permit the shafts 14 and 18 to be applied to automobiles of various sizes and types, and can be readily bent to compensate for the distance between the ends 17 and 19 of the shafts 14 and 18. The shaft 18 is operatively supported for rotation in clamps 21 which engage around the steering column the apex of rotation of the rod 18 being fixed. The upper end of the rod section 18 is angularly bent, as at 22, to form a handle.

It will be noted from Fig. 1 that this handle is disposed immediately beneath the handle or lever G which controls the throttle of the carbureter, this handle G operating over the usual quadrant. The handle or lever 22, while it is shaped similar to the handle or lever G, is slightly shorter than the same and is disposed as close beneath this lever G as is practicable.

With this device, both the throttle and auxiliary air valves are closed or opened by one movement of the hand, though they can be operated independently if desired. Pulling the lever G back or in a position to open the throttle and increase the speed opens the air valve, and pushing the lever G forward to decrease and close the throttle and decrease the speed, closes the air valve. When the shaft 18 is partly rotated, it causes partial rotation of the rod 14 through the medium of the connecting rod 20, which moves laterally with respect to said rods. As the ends 17 and 19 are disposed in spaced parallel relation, there is no danger of said ends engaging each other. In view of the novel form of connecting rod, the rods 14 and 18 rotate the same as if they were in axial alinement instead of in spaced parallel relation to each other. The provision of a regulating air valve in the intake of the engine for controllably admitting auxiliary air thereto, gives the car more power, more speed, and decreases the fuel consumption materially. The flexibility of the joints at the point of connection between the ends 19 and 17 with the link 20, and the connection of the valve stem to the end of the rod 14 is such as to permit and facilitate the operation of the device. I do not wish to be limited to the exact construction illustrated, as it is obvious that many changes might be made therewith without departing from the spirit of the invention.

I claim:—

1. An attachment for an automobile designed to control the inlet of auxiliary air thereto and comprising an air inlet pipe having a rotatable valve therein, a shaft section having a flexible connection with the inlet valve and rotating the inlet valve upon a rotation of the shaft section, the shaft section at its end remote from the air inlet valve being angularly bent, a shaft section having angularly bent ends, a connecting rod pivoted to one of said angularly bent ends and the angular end of the first named shaft section, and clamps adapted to embrace the steering column of an automobile and rotatably support the second named shaft section in contiguity with and parallel thereto.

2. In combination with an automobile, an air inlet pipe having a rotatable valve therein, a rotatable shaft extending through the dash-board of the automobile and having one end thereof yieldably and detachably connected to the inlet valve, the other end of said shaft being angularly bent and disposed in spaced parallel relation to the dash board of the automobile, an operating rotatable shaft journaled on the steering column of the automobile, said shaft being disposed in spaced relation to the first mentioned shaft, one end of said second mentioned shaft being bent in right angular relation to said shaft and disposed closely adjacent the steering wheel of the automobile to provide a handle, the other end of said second mentioned shaft being bent in angular relation to said shaft and disposed in parallel relation to the dash board of the automobile and in spaced relation to the first mentioned shaft, and a laterally movable connecting rod pivotally connecting the adjacent angular bent ends of the shafts, said connecting rod being disposed in angular relation to said angularly bent ends and arranged to transmit partial rotary movement from the second mentioned shaft to the first mentioned shaft.

In testimony whereof I hereunto affix my signature in the presence of two witnesses.

EDWARD T. DANIELS.

Witnesses:
 RICHARD HODGSON,
 E. C. REYNOLDS.